United States Patent Office 3,498,893
Patented Mar. 3, 1970

3,498,893
ANODIZATION OF A NICKEL BODY WHICH HAS A COATING OF PARTIALLY ELECTRONICALLY INSULATING MATERIAL
Ian H. S. Henderson, 661 Golden Ave., Ottawa 13, Ontario, Canada; Stephan G. Ladan, 6–10849 80th Ave., Edmonton, Alberta, Canada; and Pierre L. Bourgault, 197 Cassandra Blvd., Don Mills, Ontario, Canada
No Drawing. Filed Mar. 27, 1967, Ser. No. 625,938
Int. Cl. C23b 9/00, 3/02
U.S. Cl. 204—32                                16 Claims

ABSTRACT OF THE DISCLOSURE

Positive plates for alkaline storage batteries are produced by subjecting nickel bodies covered with a thin film of partially insulating materils, to anodization in an alkali metal hydroxide and halide containing electrolyte.

Background the invention

This invention relates to positive plates for alkaline storage batteries of the type employing nickel oxides as the active material of the positive plate. More particularly, this invention relates to improved positive plates for alkaline storage batteries and methods of producing same, said positive plates being characterized by having electrolytically-deposited nickel oxides as the active material.

Conventional high-rate nickel-cadmium batteries employ positive plates manufactured by depositing active nickel oxides within the pores and on the internal surface of porous sintered nickel substrates by one of several methods known to the industry. Conventional methods of carrying out this impregnation involve the immersion of the sintered nickel plaque in nickel nitrate soluton followed by immersion in caustic and electrolytic oxidation, the entire process being repeated several times, or immersion of the plaque in concentrated nickel nitrate solution followed by partial thermal decomposition before electrolytic oxidation in caustic (Casey process). Although such methods do give a reasonably uniform distribution throughout the plaque, they are not readily adaptable to a process for the continuous manufacture of positive electrodes.

In order to develop a positive electrode that is capable of being produced in a continuous process, attempts have been made to prepare an electrode by the anodic oxidation of nickel metal. It is known that a nickel surface may be etched in a chloride-hydroxide bath to produce a nickel oxide or hydroxide. However, the oxide or hydroxide so prepared is largely loosely-adherent and uniform deposits are not obtained until this loosely adherent material is removed. Not only is that removal costly, but the deposits obtained are either not electrochemically active, or self-discharge fairly rapidly so as to be useless as the electrodes of a battery.

Summary of the invention

It has now been found that if the surface of the nickel is covered with a thin film of partially electronically insulating material, a uniform, adherent, active deposit having a high electrochemical capacity per unit area and a slow rate of self discharge can be obtained by electrolytic means. In accordance with the present invention, positive plates suitable for alkaline storage batteries may be produced by pretreatment of the nickel foil with a partially electronically insulating material, followed by anodic oxidation in an alkali metal halide/alkali metal hydroxide electrolyte using a high current density. As these electrodes can be prepared in a continuous process and without sintering, they may be manufactured quite economically.

Description of the preferred embodiments

The thin insulating film referred to may be any of a large number of carbonaceous and other materials commonly referred to as surface-active agents, such as the di(2-ethylhexyl) ester of sodium sulphonyl succinate (aerosol O.T.); partial esters of lauric, palmitic, stearic, and oleic acids, and hexitol anhydrides derived from sorbitol, and also derivatives formed by adding polyoxyethylene chains to the non-esterified hydroxyls of the above-partial esters; and aqueous solutions of stearates and oleates. An oil-based wire drawing lubricant (E. F. Houghton & Company of Canada Limited, sold under the trade mark T. R. 159), containing animal, vegetable and mineral oils, petroleum sulphonates, a sulphated fatty ester and having a maximum free fatty acid content of 4.45% has been tested with good results.

The surface active agent is most effective when deposited together with a mineral oil, having been placed on the metal surface from an emulsion of the surface active agent, the mineral oil and the aqueous solution. Where sodium stearate or sodium oleate is employed, it is used in concentration of approximately 1 gram per litre. The above-mentioned wire drawing lubricant, when employed, may be used in a concentration of approximately 4.75% by volume. The function of this insulating film, it is believed, is to partially electronically insulate the surface of the foil and thereby reduce the tendency to evolve oxygen here in the initial stages of anodic attack. Whatever the mechanism, the presence of this thin layer facilitates the formation of active nickel oxides.

Good oxide coatings are obtained by using a current density of 0.6 to 6.0 amps per square centimetre of anode surface immersed in the bath, but usable deposits have been obtained with current densities ranging from 0.25 to 40 amps per square centimetre. It is important that a high current be passed initially, as low current densities strip the insulating film from the nickel surface and etching is inhibited. The best current density will, of course, be dependent on the residence time of the plate, which times may range from about 1 to about 120 seconds.

The electrolyte is normally an aqueous solution of potassium chloride and potassium hydroxide. Solutions with concentration ranging from 0.1 to 4 molar of potassium hydroxide have been used, and a 1 molar solution of potassium hydroxide is the one most useful. The concentration of potassium chloride is a little more critical and is dependent on the current density. If the concentration is below 0.01 molar, the attack is not uniform; and if it is above 1.5 molar, a greenish flocculent precipitate forms; preferably a concentration of 0.02 to 0.1 molar is employed. With a current density of 0.25 amp per square centimetre, a concentration of 0.02 molar in potassium chloride is preferred, whereas with a current density of 40 amps per square centimetre, the concentration preferred is about 0.04 molar. Sodium hyrdroxide and in particular lithium hydroxide are also usable, the latter having important advantages in battery applications. Satisfactory results are also obtainable by using halides other than chlorides.

The metal to be anodically etched may be first immersed in the insulating material, and then with some of the material still clinging in a thin film be transferred to the etching solution; or the anodic oxidation may be carried out by a continuous process.

In one form of continuous process described in more detail in Example II, a nickel foil anode is pulled through a bath electrolyte containing the insulating material and, just before it emerges, passes between two cathodes placed slightly below the level of the liquid. Low current densities that may cause stripping of the insulating material and passivation of the foil before reaching the cathodes are prevented by shielding the foil path in the bath until it reaches the immediate vicinity of the cathodes where high current densities are found. Gases produced during the electromechanical reaction are free to escape and the electrolyte in the cathode area is constantly exchanged by stirring. Current to the foil may be introduced via a copper drum or rollers, for example. It is important to avoid overheating of the nickel foil in the atmosphere before it reaches the bath for instance by maintaining the current at a value which the foil can pass without undue heating, any necessary adjustment being made by altering the speed of the foil and/or the distance between the shield and the surface of the liquid from which the foil emerges. Overheating may inhibit the electrolytic etching process. The oxidized foil, on leaving the bath, is washed free of electrolyte with water and it is then stored wet until its use in a battery.

The anodic oxidation of nickel foil and its embodiments are illustrated by the following examples:

EXAMPLE I

The nickel metal to be anodically etched is first immersed for at least 30 seconds in a boiling solution of approximately 1 gramme per litre sodium stearate. The metal, with some solution still clinging in a thin film is transferred to an etching solution containing one molar potassium hydroxide and 0.06 molar potassium chloride, and an anodic current of one to five amps per square centimetre passed. (While in the soap solution, the soap molecules are bound in at least a mono-layer to the oxide layer covering the metal surface and expose to the solution only the hydrophobic hydrocarbon ends of the molecule. This layer persists at least through the initial stages of anodic attack in the etching solution.)

EXAMPLE II

A length of nickel foil is pulled through an electrolytic bath 0.03 molar in potassium chloride, 1 molar in potassium hydroxide, and containing 4.75% by volume of TR 159 oil-based wire-drawing lubricant and, just before it emerges, passes between two parallel nickel rod cathodes (⅛" square rod) placed slightly below the level of the liquid. Low current densities are prevented by passing the foil through a shielding U-tube made from an inert plastic and containing electrolyte. The heights of the sides of the U-tube are so arranged that the foil does not contact the main body of the electrolyte on entering the tube and so that the foil emerges through a slit in a sealing cap on the U-tube approximately ¼" below the surface of the liquid into the main body of the electrolyte. The nickel cathodes are attached to the top of the cap parallel to and equidistant from the slit. The foil entering the U-tube is unwound from a copper drum above the entrance to the tube, which acts as an electrical contact. The electrolyte is stirred with a mechanical agitator. Direct current is used in the range 4 amps to 15 amps depending on the speed with which the foil passes through the tank. These speeds may be in the range 1 centimetre per 16 seconds up to 1 centimetre per two seconds without overhating of the foil occurring. The foil is pulled through the slit, past the cathode, out of the bath, and over a roller into a second tank where it is washed in deionized water. After washing, the foil is wound on to a rotating drum. A stream of deionized water directed on to the cold foil keeps it wet—a necessity for its subsequent performance.

What we claim as our invention is:

1. A process for the anodization of a nickel body wherein the body, covered with a thin film of a partially electronically insulating material, is anodically oxidized at a high current density in an aqueous solution of an alkali metal hydroxide containing an alkali metal halide in an amount sufficient to promote smooth anode corrosion and produce an even black film of oxide on said body.

2. A process as claimed in claim 1 wherein the partially electronically insulating material comprises a surface-active agent.

3. A process as claimed in claim 2 wherein the surface-active agent is the di(2-ethylhexyl) ester of sodium sulfosuccinate.

4. A process as claimed in claim 2 wherein the surface-active agent is a substance selected from the group consisting of partial esters of lauric, palmitic, stearic and oleic acids with a sorbitol-derived hexitol anhydride, and such partial esters with polyoxyethylene chains added to the non-esterified hydroxyls.

5. A process as claimed in claim 2 wherein the surface-active agent is sodium stearate or oleate or potassium stearate or oleate.

6. A process as claimed in claim 1 wherein the partially electronically insulating material is placed on the surface of the body from an emulsion of the surface-active agent, a mineral oil and the aqueous solution.

7. A process as claimed in claim 1 wherein the alkali metal halide is an alkali metal chloride.

8. A process as claimed in claim 1 wherein the aqueous solution is a solution of potassium chloride having a concentration in the range from 0.01 M to 1.5 M and potassium hydroxide.

9. A process as claimed in claim 8 wherein the concentration of potassium chloride is in the range from 0.02 M to 0.1 M.

10. A process as claimed in claim 1 wherein the aqueous solution is a solution of potassium chloride having a concentration of 0.06 M and potassium hydroxide having a concentration of 1 M.

11. A process as claimed in claim 1 wherein the anodic current density is in the range from 0.25 to 40 amps./cm.$^2$.

12. A process as claimed in claim 1 wherein the anodic current density is in the range 0.6 to 6.0 amps/cm.$^2$.

13. A process as claimed in claim 2 wherein the partially electronically insulating material is an oil-based wire-drawing lubricant containing animal, vegetable and mineral oils, petroleum sulphonates and a sulphated fatty ester and having a maximum free fatty acid content of 4.45%.

14. A process as claimed in claim 1 wherein the body is first immersed for at least 30 seconds in a boiling solution of sodium stearate and then electrolytically etched at a current density of from 0.25 to 40 amps/cm.$^2$ for 10 to 120 seconds in a solution containing about 1.0 M potassium hydroxide and about 0.05 to 0.1 M potassium chloride.

15. A process as claimed in claim 1 wherein in a continuous process a nickel foil anode is caused (a) to pass through a shielding tube containing an electrolyte consisting of a solution of potassium hydroxide and 0.01 M to 0.1 M potassium chloride plus a mineral oil emulsion in which the emulsifier is a surface-active agent, said tube serving to isolate the foil from the main body of the electrolyte having substantially the same composition, (b) to emerge from the tube through a slit close to the surface of the main body of electrolyte, (c) immediately thereafter to pass between two cathodes immersed in the electrolyte and undergo anodic oxidation on an anodic current density of from 0.6 to 6.0 amps/cm.$^2$, and finally (d) to pass out of the bath and be washed free of adhering electrolyte.

16. A process as claimed in claim 15 wherein 1 M potassium hydroxide and 0.03 M potassium chloride are used; the surface-active agent and mineral oil are both supplied by using an oil-based wire drawing lubricant which contains mineral oils, petroleum sulfonates, a sulfonated fatty ester and having a maximum fatty acid content of 4.25%, in a concentration of 4.75% by volume; the emerging foil is about 0.5 cm. from the surface; and the current varies with the speed of passage of the foil through the bath from 4 amps at 1 cm./16 seconds to 15 amps at 1 cm./2 seconds.

References Cited

UNITED STATES PATENTS

| 2,389,180 | 11/1949 | Brown | 204—49 |
| 2,648,627 | 8/1953 | Donnelly | 204—49 |
| 2,678,910 | 5/1954 | Brown | 204—49 |
| 2,899,367 | 8/1959 | Veeder | 204—29 |

WINSTON A. DOUGLAS, Primary Examiner

P. D. ROSENBERG, Assistant Examiner

U.S. Cl. X.R.

204—29, 56